United States Patent [19]

Wilson et al.

[11] Patent Number: 4,459,581

[45] Date of Patent: Jul. 10, 1984

[54] ALPHANUMERIC KEYBOARD HAVING IDENTIFICATION CAPABILITY

[75] Inventors: Allen K. Wilson; Frederick V. Rehhausser, both of Austin, Tex.

[73] Assignee: Data General Corporation, Westboro, Mass.

[21] Appl. No.: 286,392

[22] Filed: Jul. 22, 1981

[51] Int. Cl.³ .............................................. G06F 3/02
[52] U.S. Cl. .......................... 340/365 VL; 340/365 S; 340/365 E
[58] Field of Search ............ 340/365 R, 365 S, 365 E, 340/365 VL; 364/900 MS File; 178/17 C

[56] References Cited

U.S. PATENT DOCUMENTS 4,107,784  8/1978  Van Bremmelen .......... 340/365 VL
4,124,843 11/1978  Bramson et al. ............. 340/365 VL

OTHER PUBLICATIONS

"Electronic Translator Fits in Your Pocket", *The Washington Star*, Nov. 1978, P. C-6.

*Primary Examiner*—James J. Groody
*Attorney, Agent, or Firm*—Robert L. Dulaney

[57] ABSTRACT

An alphanumeric keyboard having the capability to identify the language supported by the keyboard and the mode of keyboard operation. A switch component having a plurality of individually settable switch elements is connected to the keyboard control logic via bidirectional lines which are used by the control logic as excitation lines during key scanning and as sense lines during switch component monitoring. The keyboard control logic, in response to a request from the terminal associated with the keyboard, changes from a key scanning mode to a switch component sampling mode. The positions of the switch elements are supplied to the terminal over a serial data line to identify keyboard characteristics.

5 Claims, 5 Drawing Figures

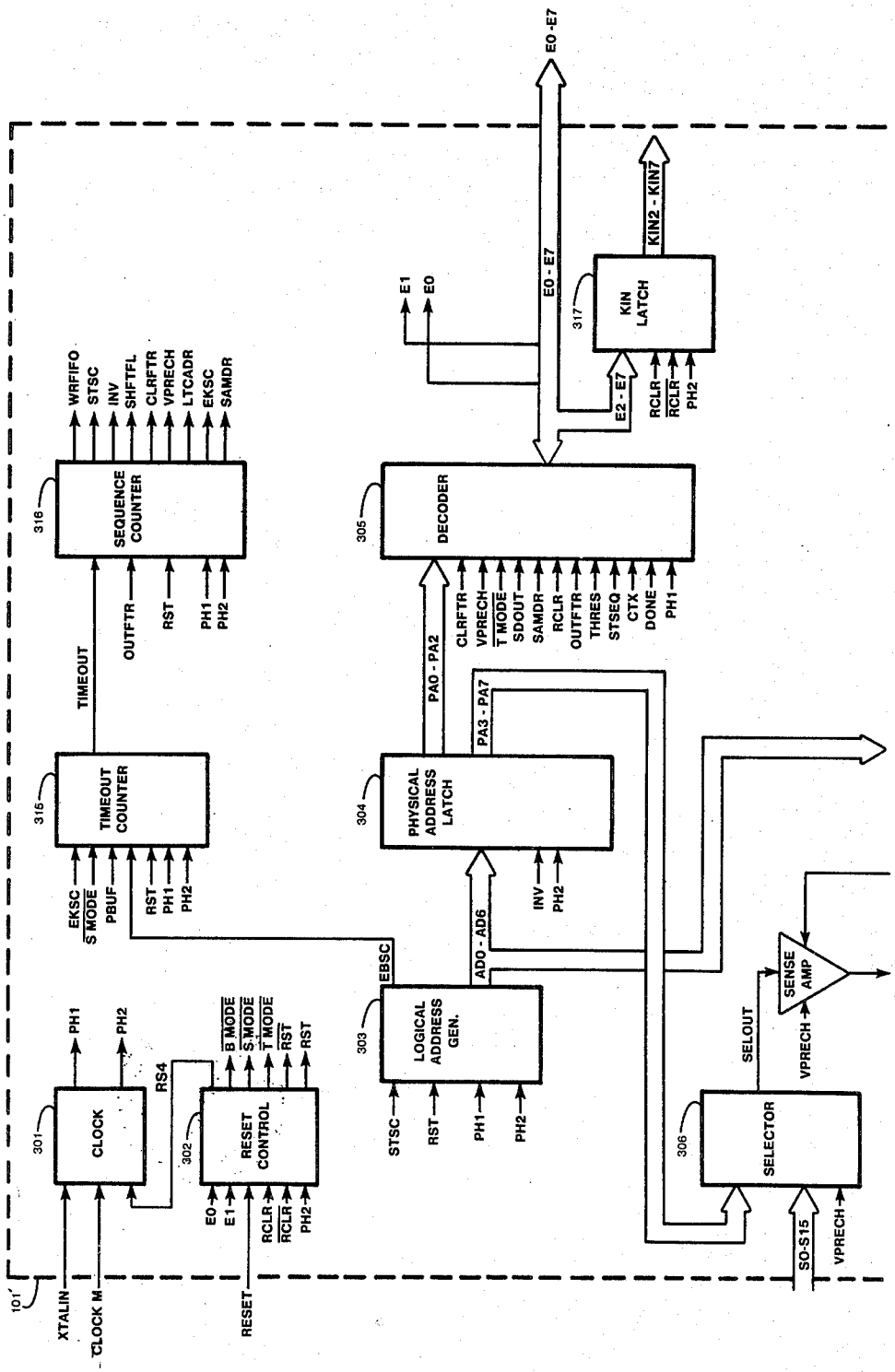

ALPHANUMERIC KEYBOARD HAVING IDENTIFICATION CAPABILITY

BACKGROUND OF THE INVENTION

The present application is related to copending U.S. application Ser. No. 286,391. Both application were filed July 22, 1981 and are assigned to Data General Corporation.

Field of the Invention

The present invention relates generally to alphanumeric keyboards for use with video display terminals and specifically to a keyboard having apparatus for identifying the keyboard language to its associated terminal.

Description of the Prior Art

Alphanumeric keyboards for use with video display terminals may be either incorporated into the cabinet which encloses the monitor and terminal electronics or may be implemented as a separate unit connected to the terminal via a cable. The latter method gives the user of the terminal greater flexibility in arranging the work station and simplifies repair and replacement of the keyboard.

Since video terminals are in use world wide, they must be able to support multiple languages. This requires supporting a variety of key symbols and keyboard character layouts. A common technique for supporting different languages is by developing a microprocessor read only memory (ROM) and a character generator ROM corresponding to the keyboard layout for each language. The microprocessor ROM provides the algorithm to relate the key struck by the operator to the correct alphanumeric character to be displayed. The character generator ROM provides the dot pattern to be displayed on the monitor for the character selected. Both ROM's are normally resident in the terminal.

This technique has the disadvantage of requiring terminal manufacturers to build and stock keyboards, microprocessor ROM's and character generator ROM's for each language the terminal will support. In addition, changing the language supported by the terminal requires not only changing the keyboard, but also removing and replacing the printed circuit boards inside the terminal which contain the ROM's.

The present invention relates to a novel circuit and method for resolving the above prior art problems.

SUMMARY OF THE INVENTION

The present invention relates to an alphanumeric keyboard having novel structure for supplying its associated video display terminal with information descriptive of the keyboard. A preferred embodiment of a keyboard incorporating the invention includes structure for retaining information descriptive of the keyboard structure for obtaining the descriptive information from the retaining structure and structure for transferring the descriptive information to the terminal.

It is another feature of the present invention that the descriptive information includes the language supported by the keyboard and the mode of keyboard operation.

It is yet another feature of the present invention that the descriptive information is transferred in response to a signal from the terminal.

It is an advantage of the present invention that microprocessor ROM's and character generator ROM's in the terminal need not be changed when the keyboard is changed.

Other features and advantages of the present invention will be understood by those of ordinary skill in the art after referring to the detailed description of the preferred embodiment and drawings herein.

BRIEF DESCRIPTION OF THE DRAWINGS

FIG. 3b is a block diagram of the remainder of Control Logic 101.

DESCRIPTION OF THE PREFERRED EMBODIMENT

Figure 1:
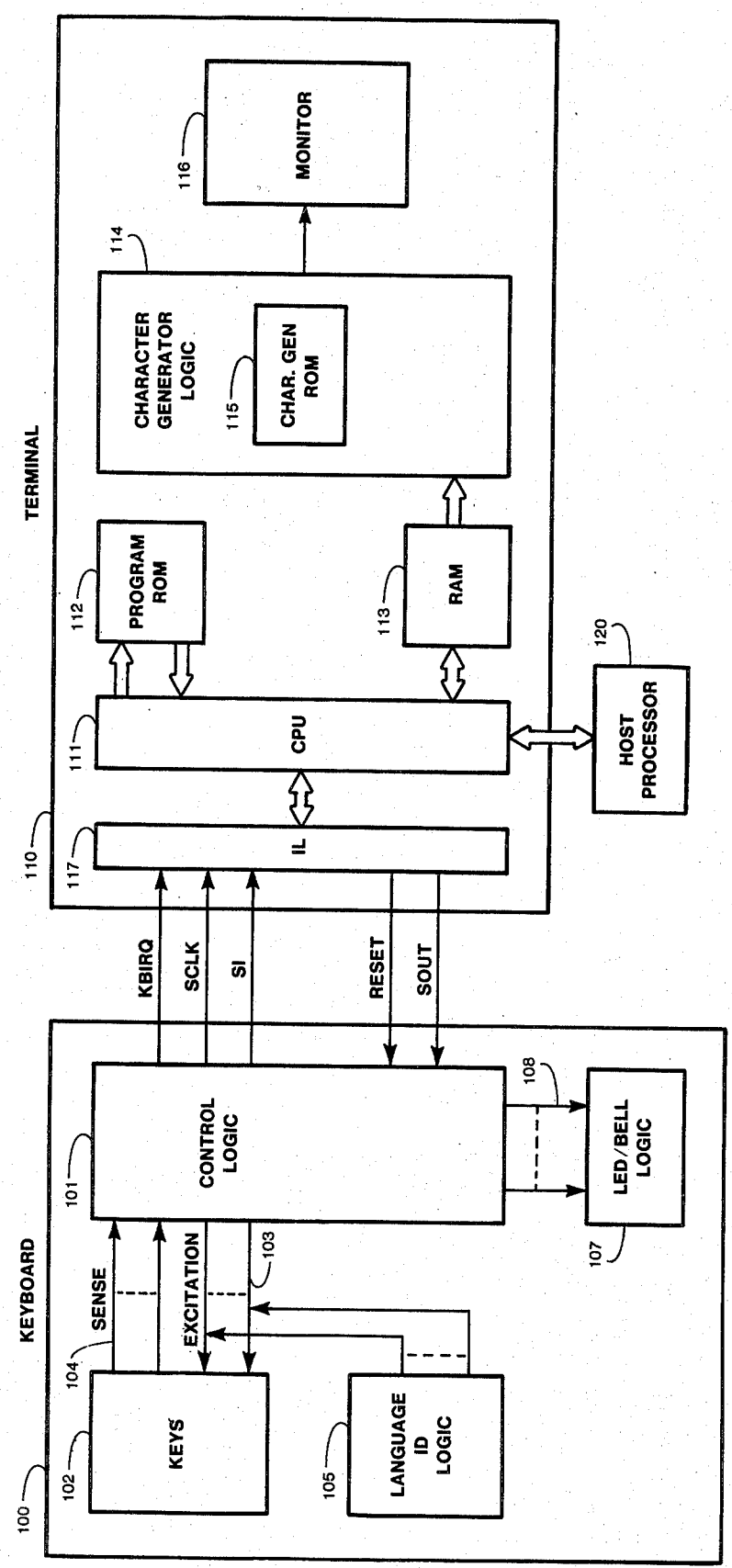
FIG. 1 is a simplified block diagram of a keyboard and major related elements of a video display terminal.

Referring to FIG. 1, a simplified block diagram of keyboard 100 and terminal 110 is shown. Control Logic 101 is connected to Keys 102 by a plurality of excitation lines 103 and a plurality of sense lines 104. Control logic 101 is also connected to language identification logic 105 by excitation lines 103 and to LED (light emitting diode)/bell logic 107 by a plurality of lines 108. Keyboard 100 sends a serial data bit stream (SI), a bit stream clocking signal (SCLK), and an interrupt request (KBIRQ) via Interface Logic 117 to central processing unit 111 in terminal 110. As will be discussed in more detail below, Control Logic 101 periodically tests Keys 102 to determine if a change in a key position has occurred since the last test sequence. Whenever Control Logic 101 detects a position change in one of Keys 102, the information identifying the specific key location is serially transmitted to Interface Logic 117 on SI along with SCLK to allow the data to be properly decoded by CPU 111.

When CPU 111 receives the key position information from Interface Logic 117, it fetches the information associated with the particular key location and language from Program ROM 112 and determines if a graphic symbol must be generated in response to the keystroke. On a typical keyboard, a number of Keys 102 are for control of terminal operations. These operational keys do not generate characters on the terminal screen and do not vary in location from language to language. Keystroke information which requires a character to be displayed is typically transmitted to Host Processor 120 for processing. Host Processor 120 will return to CPU 111 the character to be displayed in response to the keystroke. CPU 111 then rearranges the display data stored in RAM 113 so as to insert the character in the proper location. From RAM 113, the display data is supplied to Character Generation Logic 114. Within Character Generation Logic 114 is Character Generation ROM 115 which, in response to the character identifier from RAM 150, supplies the appropriate character dot pattern for transmission to Monitor 116 for display.

KBIRQ is transmitted whenever Control Logic 10 sends key position change information to Terminal 110. If, however, eight complete scans of Keys 102 have occurred with no change in the key positions being detected, KBIRQ will be "artificially" generated and transmitted. Transmission of KBIRQ is necessary, even in the absence of key activity, to provide CPU 111 with the opportunity to send LED or bell information to Keyboard 100. In addition, since long periods of time may elapse between keystrokes during terminal operations, KBIRQ also operates as a periodic indication of the presence and health of keyboard 100. If Keyboard 100 fails or becomes disconnected from Terminal 110, the absence of KBIRQ will be detected by CPU 111. Terminal 110 will then begin to send periodic RESET signals. The RESET signal requests Control Logic 101 to respond and identify its language via Language ID Logic 105, as described below. Terminal 110 will continue to transmit the RESET signal periodically until a response is received from Keyboard 110. All communications from Terminal 110 to Keyboard 100, other than RESET, are transmitted serially over Line S0.

Figure 2:
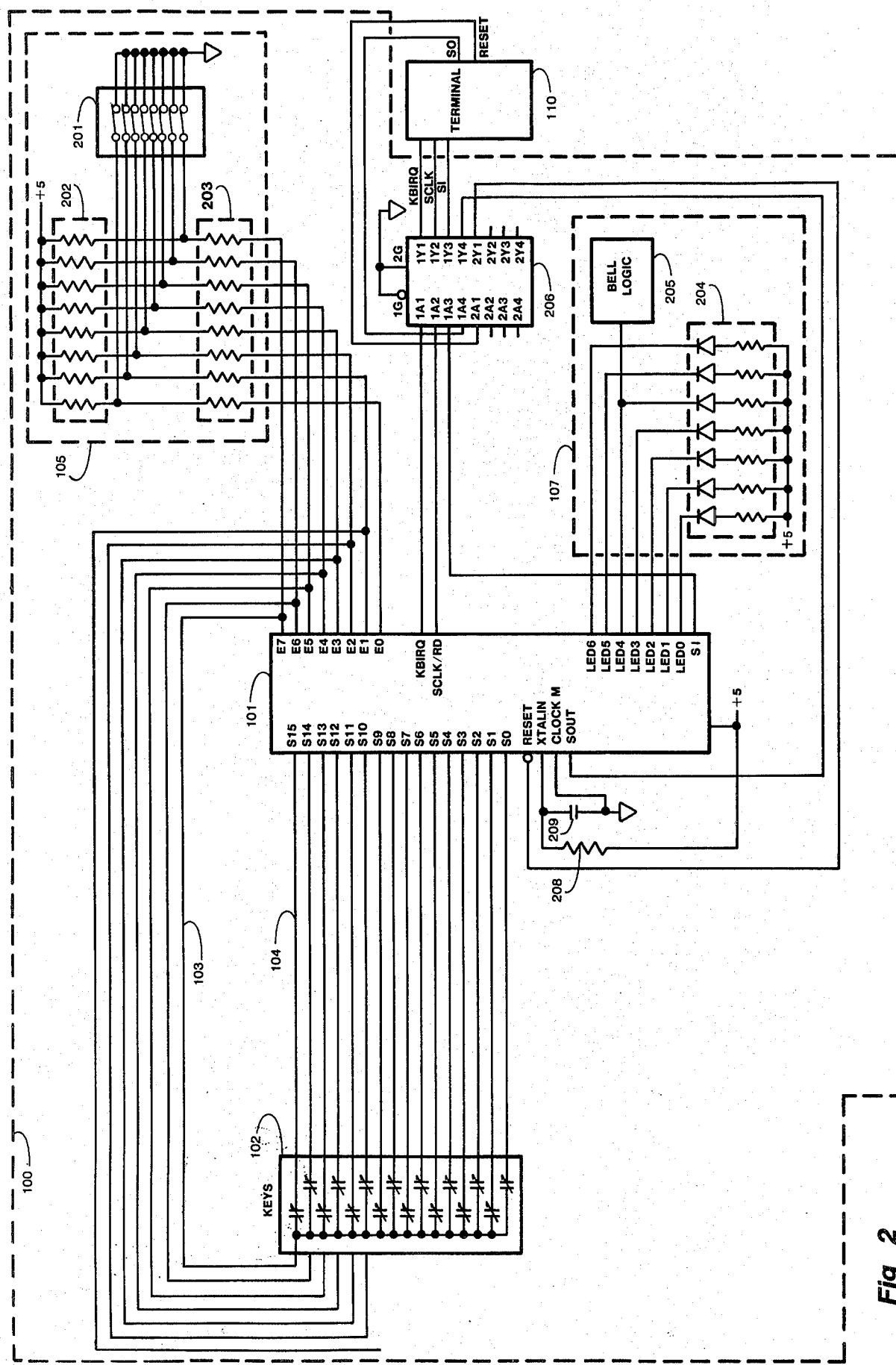
FIG. 2 is a schematic diagram of the preferred embodiment of keyboard 100.

Looking now at FIG. 2, a schematic of the preferred embodiment of the invention is shown. Control Logic 101 is implemented in this embodiment as a single chip incorporating all keyboard control functions, including clock generation, LED/Bell Logic 107 interface, Terminal 110 interface, and Keys 102 position testing. Use of a single chip is not, however, required to practice the subject invention and keyboard 100 could be implemented with a plurality of separate circuits to perform the operations of Control Logic 101. All communications from Control Logic 101 to terminal 110 and vice versa pass through Interface Buffer 206 (for example, a 74LS244).

English and European language keyboards typically have approximately 100 individual keys. Lines E1-E7 of excitation lines 103 are each connected to up to 16 keys. Each key of Keys 102 is connected to one of sense lines 104 (i.e. S0-S15). Excitation line E0 is not required in the key testing process because the sense lines for each of 7 excitation lines provides capability to test up to 112 keys, which is adequate for this embodiment. Use of excitation line E0 would allow testing of an additional 16 keys, if required.

Keyboard 100 is implemented as a "capacitive" keyboard, i.e. Keys 102 are constructed such that the capacitance of the key varies with key position. The change in capacitance which occurs when a key is depressed or released results in a detectable change in voltage on the sense line to which the key is connected. Control Logic 101 is designed to completely "scan" Keys 102, i.e. test each key for a position change, approximately 100 times per second. The scanning is done incrementally by applying an excitation voltage to excitation line E1 and monitoring, as described below, sense lines S0-S15 for an indication of the state of the keys to which the sense lines are connected. This procedure is repeated by stimulating, in turn, excitation lines E2 through E7. Control Logic compares the present sensed voltage with the sensed voltage on the prior scan. If one or more position changes is detected, terminal 110 will be notified.

Timing for Control Logic originates with resistor 208 and capacitor 209. The input timing signal XTALIN functions as the basis for the timing of all Control Logic 101 operations. CLOCKM is a clock mode signal which indicates to Control Logic 101 whether the source of timing signals is the RC circuit (as shown in FIG. 2) or a TTL clock (not used in this embodiment and not shown).

LED/Bell information received from terminal 110 is sent to LED/Bell Logic 107 via lines LED0–LED6. Each line is connected to +5 volts via one of the LED and resistor pairs 204. Each LED represents a visual indication to the user of Keyboard 100 or Terminal 110 status, such as on/off or state of the shift key. Bell Logic 205 is connected to line LED4.

Language ID Logic 105 is implemented as Switch 201, substantially identical resistors 202, and substantially identical resistors 203. Switch 201 includes eight independent single pole, single throw switch elements. Each of the eight switch elements is connected at one end to ground and at the other end to both +5 volts, via one of resistors 202 (for example, 10K ohms), and to one of excitation lines 103, via one of resistors 203 (for example, 1M ohms).

E0-E7 are bidirectional lines. When RESET is high, lines E0-E7 are in the normal transmit mode, as described above. When RESET is asserted low, E0-E7 operate as input lines to Control Logic 101. In the present embodiment, E0 and E1 are used to identify the mode of Keyboard 100 operation. E2-E7 are reserved for language identification and spares. Switch 201 is set during manufacture of Keyboard 100. The particular switch configuration will, therefore, indicate the mode and language of the keyboard.

When RESET is asserted, Control Logic 101 will sense the position of Switch 201 by sensing the presence or absence of the voltage on the individual lines E0-E7. As mentioned earlier, RESET is asserted only at Terminal 110 startup or after Terminal 110 fails to receive the KBIRQ signal on schedule. Resistors 202 and 203 (10K ohms and 1M ohms, respectively, in this embodiment) were selected to allow the positions of Switch 201 to be read when lines E0-E7 of Control Logic 101 are in the sense mode (i.e. when RESET is received) but to preclude Language ID Logic 105 from interfering with proper scanning of Keys 102 when E0-E7 are in the transmit mode.

Since Keyboard 100 has the means to identify its language, program ROM 112 and Character Generator ROM 115 can now be designed to contain information to support multiple languages, thereby eliminating the need for single language program ROM's and character generator ROM's which must be replaced when the keyboard is changed to one of another language. The language identification information from the keyboard can be used as a pointer to the proper area of the multi-languge ROM. This "standardization" reduces the number of different ROM's and simplifies the manufacture, stocking and repair of terminals. It also facilitates use of the terminal in applications where more than one language are routinely used. To change the language displayed on the terminal monitor the user need only unplug the present keyboard and replace it with one of another language. Terminal 110, as explained above, will repetitively transmit the RESET signal until keyboard 100 is reconnected and identifies its language.

The invention may be embodied in yet other specific forms without departing from the spirit or essential characteristics thereof. For example, as stated earlier, Control Logic 101 need not be implemented as a single chip, but could be constructed of a plurality of interconnected circuits. Also, Control Logic 101 could be designed with separate input lines for Language ID Logic 105, rather than designing Excitation Lines 103 to be bidirectional. In addition, Language ID Logic 105 could be implemented with a plurality of transistors rather than with Switch 201.

Figure 3A:
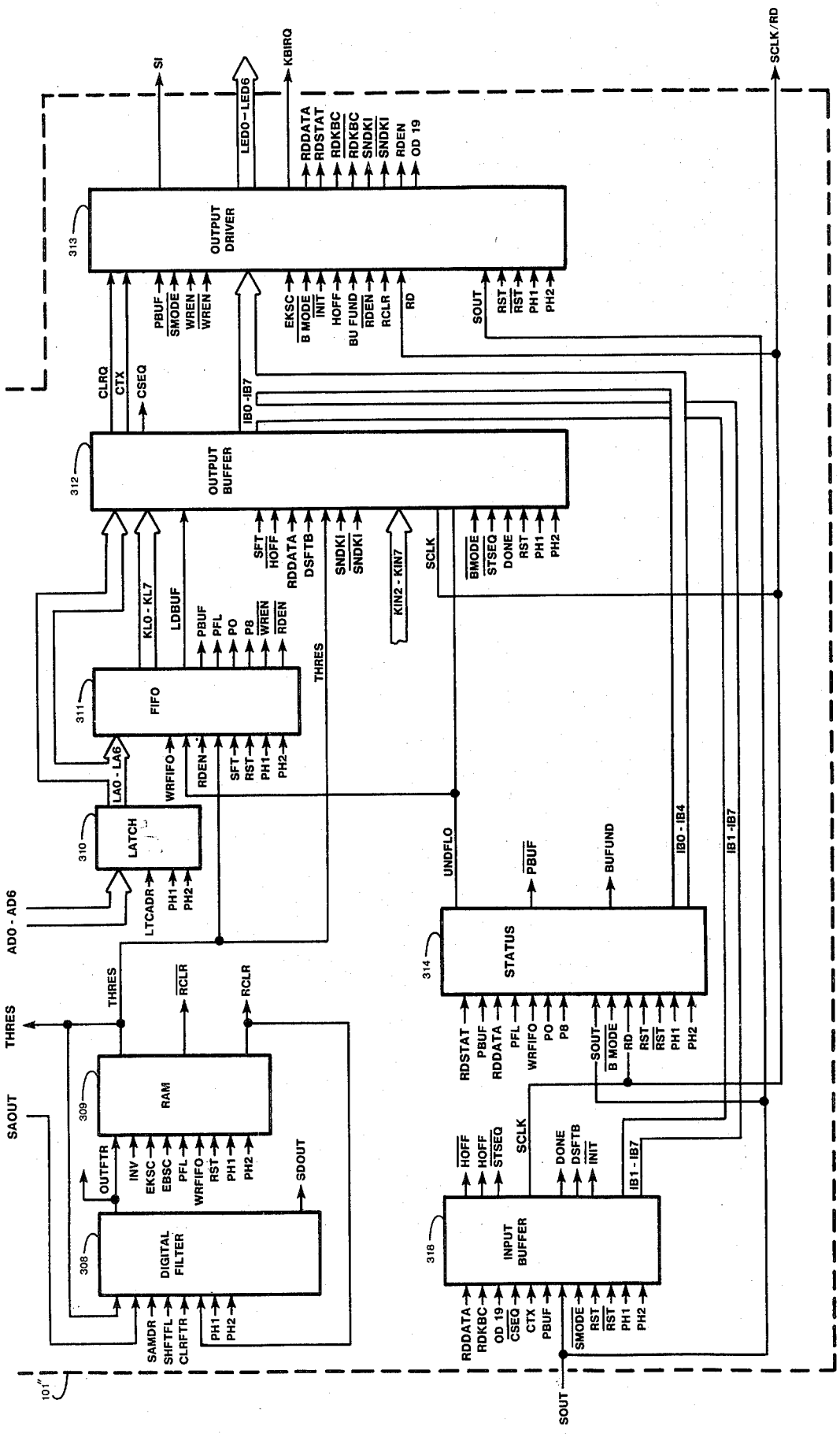
FIG. 3a is a block diagram of portions of Control Logic 101.

Looking now at FIGS. 3 and 3a, blocks 101' and 101", viewed together, form a block diagram of Control Logic 101. It should be understood that Control Logic 101 is designed to be capable of operating in either a serial output mode or a bus output mode. In the embodiment described in FIGS. 1 and 2, however, only the serial mode capability is used. Certain functions and operations of Control Logic 101 related to bus mode are, therefore, not discussed in detail. In addition, Control Logic 101 has certain interconnections related to a test mode used only to verify the operation of Keyboard 100 during manufacture or after repair.

Because of the numerous signals and large amount of interaction, many signals in and out of the blocks, for clarity of presentation, are depicted as a signal name accompanied by an arrow indicating whether the signal is an input or an output of the particular block. To further assist in the reading and understanding of FIGS. 3 and 3a, Table I gives a brief description of signal names internal to Control Logic 101. It should be understood that certain signals defined in Table I without a bar over the signal name may appear in FIGS. 3 and 3a both with and without a bar. In these cases, the presence of the bar indicates the inverse of the unbarred signal.

TABLE I

| | | |
|---|---|---|
| AD0–AD6 | logical address of key to be scanned | |
| | Originates: 303 | To: 304, 310 |
| $\overline{BMODE}$ | indicates Control Logic 101 is not operating in bus input/output mode | |
| | Originates: 302 | To: 312, 313, 314 |
| BUFUND | indicates FIFO 311 contains no data or UNDFLO is not set | |
| | Originates: 314 | To: 313 |
| CLRFTR | zeroes contents of Digital Filter 308 at the start of each key scan | |
| | Originates: 316 | To: 305, 308 |
| CLRQ | clears the SI line | |
| | Originates: 312 | To: 313 |
| CSEQ | clears Input Buffer 318 | |
| | Originates: 312 | To: 318 |
| CTX | indicates end of transmission from Output Buffer 312 | |
| | Originates: 312 | To: 305, 318 |
| DONE | indicates end of transmission from Input Buffer 318 | |
| | Originates: 318 | To: 312 |
| DSFTB | shift delay signal to Output Buffer 312 | |
| | Originates: 318 | To: 312 |
| EBSC | indicates completion of the scan of all keys on the keyboard | |
| | Originates: 303 | To: 315 |
| EKSC | indicates completion of the scan of an individual key | |
| | Originates: 316 | To: 309, 315 |
| HOFF | identifies the type of serial transmission | |
| | Originates: 318 | To: 313 |
| $\overline{HOFF}$ | inverse of HOFF | |
| | Originates: 318 | To: 312 |
| IB0–IB7 | data to Output Driver 313 | |
| | Originates: 312, 314, 318 | To: 313 |
| $\overline{INIT}$ | initiates serial transmission | |
| | Originates: 318 | To: 313 |
| INV | indicates beginning of a new key during scan operations | |
| | Originates: 316 | To: 309 |
| KIN2–KIN7 | identifies the type of keyboard | |
| | Originates: 317 | To: 312 |
| LA0–LA6 | Logical address of a key from Latch 310 | |
| | Originates: 310 | To: 311, 312 |

TABLE I-continued

| | | |
|---|---|---|
| LDBUF | controls loading of Output Buffer 312 from Latch 310 and RAM 309 | |
| | Originates: 311 | To: 312 |
| LTCADR | latches logical address in Latch 310 | |
| | Originates: 316 | To: 310 |
| OD19 | indicates completion of the scan of a key | |
| | Originates: 313 | To: 318 |
| OUTFTR | indicates whether a key position change was detected | |
| | Originates: 308 | To: 305, 309, 316 |
| PA0–PA2 | identifies a specific excitation line to be stimulated | |
| | Originates: 304 | To: 305 |
| PA3–PA7 | identifies a specific sense line to be sensed | |
| | Originates: 304 | To: 306 |
| PBUF | pointer to indicate information is stored in Output Buffer 312 | |
| | Originates: 311 | To: 313, 314, 315, 318 |
| PFL | indicate overflow of FIFO 311 | |
| | Originates: 311 | To: 309, 314 |
| PH1 | clocking signal | |
| | Originates: 301 | To: 303, 304, 305, 308, 309, 310, 311, 312, 313, 314, 315, 316, 318 |
| PH2 | clocking signal | |
| | Originates: 301 | To: 302, 303, 304, 308, 309, 310, 311, 312, 313, 314, 315, 316, 317, 318 |
| P0 | pointer to lowest register of FIFO 311 | |
| | Originates: 311 | To: 314 |
| P8 | pointer to middle register of FIFO 311 | |
| | Originates: 311 | To: 314 |
| RCLR | clears RAM 150 | |
| | Originates: 309 | To: 302, 305, 308, 313, 317 |
| $\overline{RCLR}$ | inverse of RCLR | |
| | Originates: 309 | To: 302, 317 |
| RD | input read signal when SCLK/RD line is in input mode (bus mode only) | |
| | Originates: terminal 110 | To: 313, 314 |
| RDDATA | requests reading of data (bus mode only) | |
| | Originates: 313 | To: 312, 314 |
| RDEN | read enable signal to FIFO 311 | |
| | Originates: 313 | To: 311 |
| $\overline{RDEN}$ | inverse of RDEN | |
| | Originates: 311 | To: 313 |
| RDKBC | enables reading of data or status information (bus mode only) | |
| | Originates: 313 | To: 318 |
| RDSTAT | requests reading of status information (bus mode only) | |
| | Originates: 313 | To: 314 |
| RST | reset signal | |
| | Originates: 302 | To: 303, 304, 309, 311, 312, 313, 314, 315, 316, 318 |
| $\overline{RST}$ | inverse of RST | |
| | Originates: 302 | To: 313, 314, 318 |
| RS4 | clock 301 reset signal | |
| | Originates: 302 | To: 301 |
| SAMDR | Clock signal for latching SDOUT | |
| | Originates: 316 | To: 305, 308 |
| SAOUT | indicates if Sense Amp 307 detected a key position change | |
| | Originates: 307 | To: 308 |
| SCLK | serial output clock signal when SCLK/RD is in output mode (serial mode only) | |
| | Originates: 318 | To: 312, terminal 110 |
| SDOUT | latched output of Sense Amp 307 | |
| | Originates: 308 | To: 305 |
| SELOUT | signal from the selected sense line | |
| | Originates: 306 | To: 307 |
| SFT | shifts information in FIFO 311 and loads Output Buffer 312 | |
| | Originates: 318 | To: 311, 312 |

TABLE I-continued

| | |
|---|---|
| $\overline{\text{SMODE}}$ | indicates Control Logic 101 is not in serial input/output mode |
| | Originates: 302      To: 312, 313, 315 |
| SNDKI | initiates sending keyboard identification information |
| | Originates: 313      To: 312 |
| STSC | increments Logical Address Generator 303 |
| | Originates: 316      To: 303, 304 |
| $\overline{\text{STSEQ}}$ | starts serial transmission |
| | Originates: 318      To: 305, 312 |
| THRES | key position sensed on prior scan |
| | Originates: 309      To: 305, 307, 308, 311 |
| TIMEOUT | indicates FIFO 311 and Output Buffer 312 have remained empty for a predetermined number of complete keyboard scans (serial mode only) |
| | Originates: 315      To: 316 |
| $\overline{\text{TMODE}}$ | indicates Control Logic 101 is not in test mode |
| | Originates: 302      To: 305 |
| UNDFLO | indicates Status 314 was read when no valid data was available for transmission (bus mode only) |
| | Originates: 314      To: 311, 312 |
| VPRECH | precharge signal used by Sense Amp. 307, Selector 306 and Decoder 305 |
| | Originates: 316      To: 306, 307 |
| $\overline{\text{WREN}}$ | loads FIFO 311 or Output Buffer 312 from Latch 310 |
| | Originates: 311      To: 313 |
| WRFIFO | controls storing of data in FIFO 311 |
| | Originates: 316      To: 309, 311, 314 |

Timing for internal operations of Control Logic 101 is provided by Clock 301. XTALIN is an input clock pulse which may be from either an RC circuit, as in this implementation, or from an external TTL clock. CLOCKM identifies to Clock 301 which clock source is being used. Clock 301 outputs clock pulses PH1 and PH2 derived from XTALIN.

As stated above, when RESET is transmitted by Terminal 110, excitation lines E0-E7 are treated as input lines from Language ID Logic 105. In this embodiment, E0 and E1 are supplied to Reset Logic 302 to indicate the operating mode of Control Logic 101 (serial in this embodiment) and E2-E7 are supplied to KIN Latch 317 to identify the specific language supported by Keyboard 100. Reset Control 302, in response to RESET, E0 and E1, then supplies mode signals $\overline{\text{BMODE}}$, $\overline{\text{SMODE}}$ and $\overline{\text{TMODE}}$ and reset signals RST, $\overline{\text{RST}}$ and RS4. The reset signals from Reset Control 302 are subsequently reset by RCLR and $\overline{\text{RCLR}}$.

To begin each keyboard scan, Sequence Controller 316 supplies STSC to Logical Address Generator 303. Logical Address Generator 303 then begins to generate sequential logical addresses for Physical Address Latch 304 and Latch 310. Each logical address corresponds to the one of Keys 102 which is to be scanned. Physical Address Latch 304, upon receipt of INV, supplies PA0-PA2 to Decoder 305, to identify which of excitation lines 103 (E0-E7) is to be stimulated to apply a voltage to the key to be scanned, and PA3-PA7 to Selector 306, to identify which of Sense Lines 104 (S0-S15) is to be selected for sensing the return voltage from the key to be scanned. Decoder 305 also receives SDOUT, SAMDR, OUTFTR, THRES, STSEQ, CTX, DONE and PH1, which are transmitted over E0-E7 only in test mode.

The signal selected by Selector 306 (SELOUT) is provided to Sense Amp 307. As discussed earlier, because each of Keys 102 can be considered to be a variable capacitor, the voltage returned on the sense line will be determined by the position of the key. Sense Amp 307 compares SELOUT with a reference voltage to determine the current position of the key. To reduce the possibility of false position indications resulting from keys in interim positions (i.e. less than full up or full down), the reference voltage level used by Sense Amp 307 is based on the prior position of the key (THRES) from RAM 309. VPRECH precharges elements in Selector 306 and Sense Amp 307 and serves as a timing input to Decoder 305 for strobing of the excitation lines. The use of VPRECH and the operation of Sense Amp 307 will be discussed in more detail below.

The output of Sense Amp 307 (SAOUT) is generated and supplied to Digital Filter 308 six times for each key. Digital Filter 308, which is cleared prior to scanning of each key by CLRFTR, compares SAOUT with THRES from RAM 309. To further reduce the possiblity of false key stroke determinations resulting from noise or key teasing, Digital Filter 308 only indicates a position change if four or more of the six SAOUT signals for the key indicate a position change. If the output of Digital Filter 308, OUTFTR, indicates a position change, the new position will be stored in RAM 309. Also, Sequence Controller 316 will generate LTCADR to latch the logical address of the key in Latch 310 and will generate WRFIFO to store the latched address and THRES in one of the registers in FIFO 311 or, if Output Buffer 312 contains no data, to store the information directly in Output Buffer 312.

FIFO 311 contains a plurality of 8 bit registers such that a number of sets of key position change information can be retained until Processor 111 in Terminal 110 can read the information. If reading from FIFO 311 is enabled (RDEN), SFT will cause the "lowest" register of FIFO 311 to be shifted to Output Buffer 312 and any other data stored FIFO 311 to be shifted "down" to the next lowest register such that the oldest information in FIFO 311 is the first to be transmitted to Terminal 110. The outputs of FIFO 311 include a load command (LDBUF) to Output buffer 312, pointers PFL, P0, P8, PBUF to indicate the status of FIFO 311 and Output Buffer 312, and status signals $\overline{\text{WREN}}$ and $\overline{\text{RDEN}}$. If FIFO 311 is full, indicated by PFL, further entries in FIFO 311 are prevented and updates of RAM 309 are suspended until FIFO 311 space is available. In bus mode, status information about the contents of FIFO 311 and Output Buffer 312 would be made available to CPU 111 over IB0-IB4 from Status 314. No data is transmitted over IB0-IB4 from Status 314 in serial mode.

Output Buffer 312 can be loaded from Latch 310 and RAM 309, from FIFO 311 or, in response to RST, from KIN Latch 317. In addition to sending data over IB0-IB7, Output Buffer 312 clears the SI line (CLRQ), clears Input Buffer 318 (CSEQ) and indicates the end of its transmission. (CTX) Output Driver 313 transmits the contents of Output Buffer 312 over SI to terminal 110 in accordance with the SCLK pulse. SCLK/RD is a bidirectional line which transmits SCLK to terminal 110 when keyboard 100 is in serial mode. The receive function (RD) of SCLK/RD is used in bus mode only.

CPU 111 will indicate to Control Logic 101, via the state of SOUT, when CPU 111 is ready to receive key change data. Output Buffer 312, if it contains data will send the key position identifier and the key location data to Output Driver 313. The information is then serially transmitted, along with a start code, via SI, to Buffer 206 and on to IL 117, where it is held pending action by CPU 111. After transmission of the data is completed, KBIRQ is sent to notify Terminal 110 that the data has been sent. This procedure will repeat until FIFO 311 and Output Buffer 312 are empty or until CPU 111 indicates that it is no longer ready to receive key position data. In bus mode, which is not used or required in this implementation, KBIRQ would be generated when key data is loaded into Output Buffer 312.

As stated earlier, extended periods of time may occur between key strokes and, therefore, no key data will be loaded into Output Buffer 312. Since KBIRQ, in the serial mode of operation, acts as a request for any LED or bell information which CPU 111 may wish to send, Control Logic 101 will cause KBIRQ to be generated whenever eight scans of Keys 102 are completed with Output Buffer 312 being empty (i.e. no data waiting to be transmitted) and without detection of a key position change. This allows CPU 111 to send information to Keyboard 100 in the absence of key position changes. Logical Address Generator 303 sends EBSC to Timeout Counter 315 at the completion of each complete scan of Keys 102. A complete scan will occur substantially every 10 milliseconds. If eight EBSC pulses are counted by Timeout Counter 315 and PBUF indicates that Output Buffer 312 has remained empty during the eight scans, TIMEOUT will be generated. Upon receipt of TIMEOUT, Sequence Controller 316 will generate WRFIFO to cause Output Buffer 312 to be loaded with all zeros. CPU 111 will, upon receipt of the zeros, recognize it as a TIMEOUT generated interrupt, rather than valid key change information.

Input Buffer 318 receives information via SOUT from Terminal 110 to drive LED/bell Logic 108. If LED/bell information is received, Input Buffer will, at the conclusion of a transmission in progress from Output Buffer 312, delay shifting of additional information into Output Buffer 312 until the data in Input Buffer 318 has been transmitted. DONE then releases Output Buffer 312.

Figure 4:
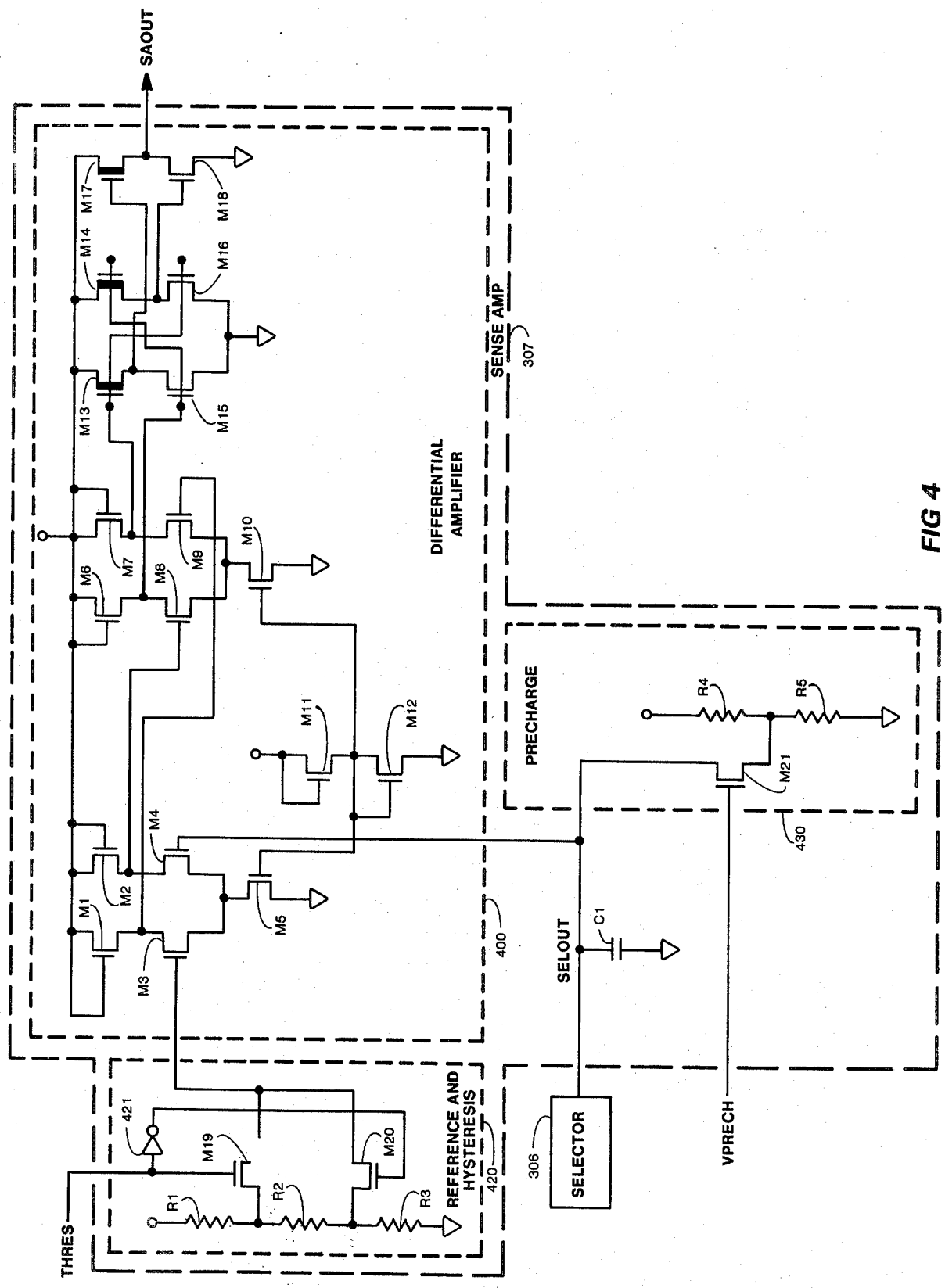
FIG. 4 is a schematic diagram of Sense Amp 307.

Looking now at FIG. 4, a schematic diagram of Sense Amp 307 is shown. Differential Amplifier Logic 400 is constructed of enhancement mode MOSFET transistors M1-M12, M15, M16 and M18 and depletion mode MOSFET transistors M13, M14 and M17. Within Differential Amplifier Logic 400, M1-M5 are connected as a first differential amplifier stage, M6-M10 are connected as a directly coupled second differential amplifier stage, M11 and M12 are connected as a biasing circuit to hold the gates of M5 and M10 at a constant voltage. M13-M16 are connected as a third amplifier stage, and M17 and M18 are connected as a level shifter to adjust the output of Differential Amplifier Logic 400 to the proper level.

Within Differential Amplifier Logic 400, the drains of M1, M2, M6, M7, M11, M13, M14 and M17 and the gates of M1, M2, M6, M7 and M11 are connected to a constant voltage. The source of M1 is connected to the drain of M3 and the gate of M9. The source of M2 is connected to the drain of M4 and the gate of M8. The sources of M3 and M4 are connected to the drain of M5. The source of M11 is connected to the gates of M5 and M10 and the drain and gate of M12. The source of M6 is connected to the drain of M8 and the gates of M15 and M14. The source of M7 is connected to the drain of M9 and the gates of M13 and M16. The sources of M8 and M9 are connected to the drain of M10. The source of M13 is connected to the drain of M15 and the gate of M17. The source of M14 is connected to the drain of M16 and the gate of M18. The sources of M5, M10, M12, M15, M16 and M18 are connected to ground. The source of M17 is connected to the drain of M18 and to output signal SAOUT. The gate of M3 is connected to Reference and Hysteresis Logic 420 and the gate of M4 is connected to Precharge Logic 430, Selector 306 and, in effect, to capacitance C1, which represents the parasitic capacitances inherently associated with the integrated circuitry and printed circuit board.

Reference and Hysteresis Logic 420 is constructed of resistors R1, R2 and R3, enhancement mode MOSFET transistors M19 and M20, and inverter 421. The gate of M19 is connected to THRES (from RAM 309) and the input of inverter 421. The gate of M20 is connected to the output of inverter 421 (i.e., the inverse of THRES). R1 is connected at one end to a constant voltage source and at the other end to one end of R2 and the drain of M19. R3 is connected at one end to ground and at the other end to the other end of R2 and the drain of M20. The sources of M19 and M20 are connected to the gate of M3.

Precharge Logic 430 is constructed of enhancement mode MOSFET transistor M21 and resistors R4 and R5. The drain of M21 is connected to the gate of M4, Selector 306 and Capacitance C1. The source of M21 is connected to one end of R4 and R5. The other end of R4 is connected to a consant voltage and the other end of R5 is connected to ground. Finally, the gate of M20 is connected to precharge signal VPRECH, from Sequence Controller 316.

As was discussed earlier, referring to FIGS. 2, 3, and 3a, each excitation line E1-E7 is connected to up to 16 keys of Keys 102. Each key, in turn, is connected to Selector 306 by one of Sense Lines S0-S15. Each key, as mentioned, operates as a variable capacitor, in that the key capacitance (C2) varies with key depression. Since the key capacitance affects the voltage seen by Sense Amp 307 from the selected sense line, comparison of the returned voltage with the voltage corresponding to the state of the key from the prior scan of Keys 102 allows key position to be detected.

When VPRECH is asserted by Sequence Controller 316, M21 is turned on and the divided voltage from R4 and R5 is allowed to pass to C1 and to the key (C2). After a length of time, dependent on element values, C1 and C2 will have been charged to the level of the voltage passed by M21 from R4 and R5. This bias voltage will remain at the gate of M4, if VPRECH is removed, until leakage or an external stimulus changes it. By appropriate selection of the ratio of R4 and R5, the bias voltage can be made to exceed the threshold of M4. This will allow M4 to amplify comparison voltages much smaller than its threshold, which is typically about 1.5V.

It is highly desirable to avoid false determinations of keystrokes due to key "teasing" (i.e., partial depression of a key). Most of the effects of teasing can be eliminated by varying the reference voltage against which the voltage from the sense line is compared. For purposes of illustration, assume the state voltage returned if a key is completely up is approximately 75 mv while a fully depressed key will return a state voltage of 300 mv. These numbers are for discussion only and are chosen only to illustrate a sample embodiment of the invention. If the key had been up at the last scan of the keyboard, the reference voltage could be set at, for example, 225 mv (plus the bias voltage to M4) to ensure the key is almost fully depressed before a position change is flagged. Similarly, if the previous key position was down, the reference could be set at 150 mv (plus the bias voltage to M4) to ensure the key is almost fully up before a position change is flagged.

For each key being sampled, the THRES signal, representing the last detected state of the key, is supplied to the gate of M19. The inverse of THRES is supplied to the gate of M20. Either M19 or M20 will therefore be allowed to pass a voltage to gate of M3. This voltage will be the reference against which the voltage from the key will be compared. By appropriate adjustment of the ratios of the values of R1, R2 and R3, the magnitude of the reference voltage will be either the "key-up" reference voltage or the "key-down" reference voltage, depending on the prior key state.

Figure 5:
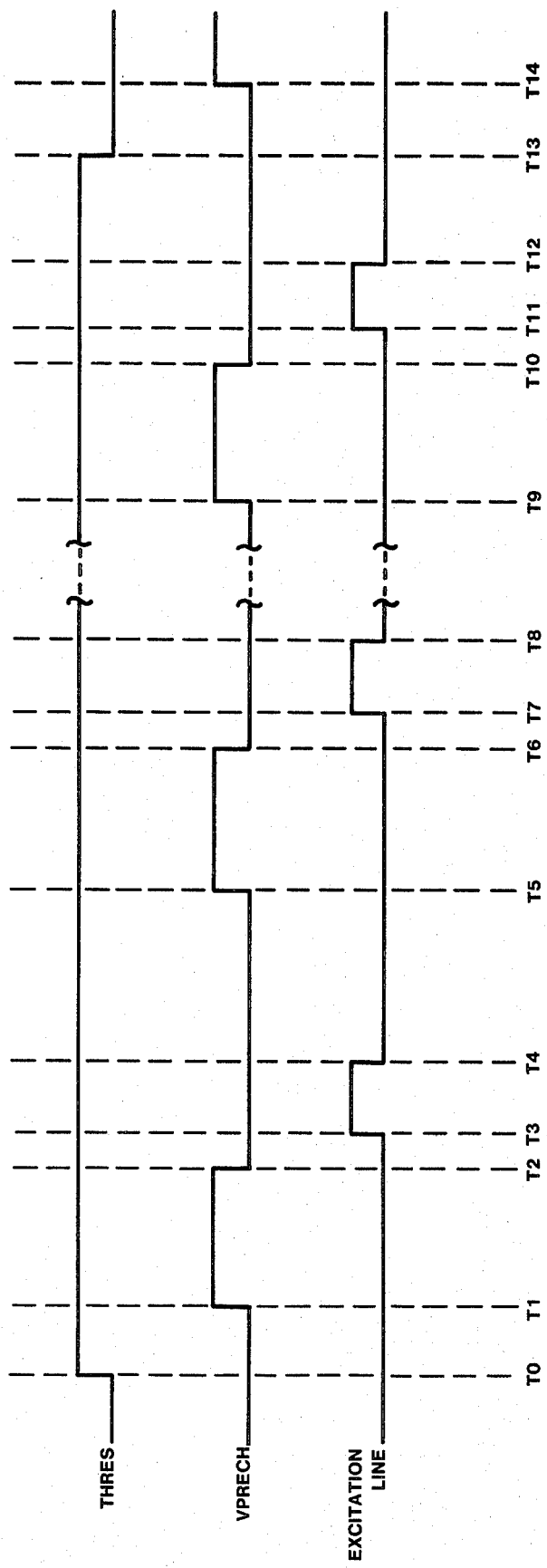
FIG. 5 is a timing diagram illustrating the operation of Sense Amp 307.

Referring now also to FIG. 5, the operation of Sense Amp 307 will be discussed. The signal labeled "Excitation Line" in FIG. 5 represents the voltage applied to the appropriate excitation line (E1-E7) connected to the key to be sampled. At T0, the THRES signal for the next key to be sampled is supplied to Sense Amp 307 from RAM 309. This signal, or its inverse, will turn on either M19 or M20 to provide the appropriate reference voltage to M3. In this example, THRES goes high at T0, turning M19 on and M20 off. At T1, VPRECH is imposed on M21 and also on the excitation line and sense line, to ensure all capacitances are precharged. From T1 to T2, C1 and C2 are charged to the divided voltage from R4 and R5 and M4 is turned on. At T2, VPRECH is removed. C1 and C2 substantially retain their voltage levels. At T3, a voltage is applied to the appropriate excitation line. This step voltage is divided by the ratio of C2 to C1. Since the capacitance of the key (C2) is variable, the ratio will be a function of key position. The state voltage resulting from the sense line is added to the bias voltage left by the precharging process at the gate of M4. Differential Amplifier Logic 400 will compare the reference voltage with the comparison voltage and produce output SAOUT. If the comparison voltage exceeds the reference voltage (i.e., key is down) SAOUT will be substantially 0V. If the comparison voltage is less than the reference voltage (i.e., key is up), SAOUT will be substantially +5V.

At T4, after a sufficient time period to allow SAOUT to be sampled by Digital Filter 308, the voltage is removed from the excitation line. As stated earlier, each key is sampled 6 times by Digital Filter 308. Therefore, at T5, VPRECH is asserted again until T6. At T7, the voltage is applied to the excitation line and SAOUT is again output from Differential Amplifier 400 to Digital Filter 308. At T8, the voltage is removed from the excitation line. This precharge and excitation line sequence will continue until SAOUT has been supplied 6 times to Digital Filter 308. At T12, the excitation line goes low for the sixth time. At T13, sampling of the key is complete and the THRES value for the next key is supplied to Reference and Hysteresis 420.

With the present invention, variations in reference voltage may be controlled within a few millivolts. If the reference voltage must be changed, a new hysteresis point can be achieved simply by varying the ratios of the Reference and Hysteresis 420 resistors. Also, since the reference voltage is dependent only upon the ratio of resistor values, and not their absolute values, the effects of processing variations are substantially eliminated. In addition, precharging C1 and C2 to a level above the threshold of M4 allows the circuit to amplify state voltages on the order of 20 millivolts.

The invention may be embodied in yet other specific forms without departing from the spirit or essential characteristics thereof. For example, while the present embodiment uses Sense Amp 307 with a capacitance keyboard, it can be adapted for any small signal amplification need by the appropriate choice of C1 and C2. In addition, Differential Amplifier Logic 400 could be modified in various ways using well known differential amplifier techniques to achieve the type of output signal required.

The present embodiments are therefore to be considered in all respects as illustrative and not restrictive. The scope of the invention is indicated by the appended claims rather then by the foregoing description, and all changes which come within the meaning can range of equivalency are therefore intended to be embraced therein.

We claim:

1. An alphanumeric keyboard for use with a video display terminal have multilanguage capability, said keyboard comprising:
   a plurality of individually activatable keys;
   means for retaining information descriptive of said keyboard;
   logic means connected to said keys by a plurality of bidirectional lines and a plurality of sense lines and connected to said retaining means by said bidirectional lines, said logic means having at least two modes of operation, a first mode for repetitively scanning said keys to detect a key postion change and a second mode for obtaining said information description of said keyboard, said bidirectional lines being operable as excitation lines to said keys in said first mode and being operable as sense lines from said retaining means in said second mode; and
   means for transferring said key position change information and said keyboard descriptive information to said terminal.

2. The Keyboard of claim 1, wherein said descriptive information comprises information identifying the language supported by said keyboard.

3. The Keyboard of claim 2, wherein said descriptive information further comprises information identifying the mode of keyboard operation.

4. The Keyboard of claim 1 wherein said retaining means comprises a plurality of individually changeable switch elements, a like plurality of substantially identical first resistors and a like plurality of substantially identical second resistors, each of said first resistors being coupled between one of said bidirectional lines and one of said switch elements and each of said second resistors, being coupled between a voltage source and one of said switch elements such that the state of said switch elements controls the voltage sensed on said bidirectional lines, and
   said first and second resistors being selected to be of a size such that the scanning of said keys is substantially unaffected by the voltage contribution of said retaining means on said bidirectional lines.

5. The Keyboard of claim 1 wherein said logic means further comprises means responsive to a signal from said terminal for controlling the mode of said logic means.

* * * * *